United States Patent
Huang et al.

(10) Patent No.: US 12,202,000 B2
(45) Date of Patent: Jan. 21, 2025

(54) METHOD AND SYSTEM FOR LANGMUIR-BLODGETT ASSEMBLY

(71) Applicant: NORTHWESTERN UNIVERSITY, Evanston, IL (US)

(72) Inventors: Jiaxing Huang, Wilmette, IL (US); Huali Nie, Evanston, IL (US)

(73) Assignee: NORTHWESTERN UNIVERSITY, Evanston, IL (US)

(*) Notice: Subject to any disclaimer, the term of this patent is extended or adjusted under 35 U.S.C. 154(b) by 0 days.

(21) Appl. No.: 17/483,993

(22) Filed: Sep. 24, 2021

(65) Prior Publication Data

US 2022/0008939 A1 Jan. 13, 2022

Related U.S. Application Data

(62) Division of application No. 15/223,617, filed on Jul. 29, 2016, now abandoned.

(60) Provisional application No. 62/199,537, filed on Jul. 31, 2015.

(51) Int. Cl.
| | |
|---|---|
| *B05B 5/025* | (2006.01) |
| *B05D 1/20* | (2006.01) |
| *C09D 139/06* | (2006.01) |
| *B05D 1/06* | (2006.01) |

(52) U.S. Cl.
CPC .............. *B05B 5/025* (2013.01); *B05D 1/204* (2013.01); *C09D 139/06* (2013.01); *B05B 5/0255* (2013.01); *B05D 1/06* (2013.01)

(58) Field of Classification Search
None
See application file for complete search history.

(56) References Cited

U.S. PATENT DOCUMENTS

| | | | | |
|---|---|---|---|---|
| 5,873,523 | A | * 2/1999 | Gomez | B05B 5/0255 239/3 |
| 6,126,086 | A | * 10/2000 | Browner | B05B 7/066 239/102.1 |
| 2006/0174763 | A1 | * 8/2006 | Scaringe | B03C 3/53 95/57 |
| 2012/0295097 | A1 | * 11/2012 | Lotus | D04H 1/728 428/317.9 |

OTHER PUBLICATIONS

Vogel, Macromol. Chem. Phys. 2011, 212, 1719-1734 (Year: 2011).*

(Continued)

*Primary Examiner* — Binu Thomas
(74) *Attorney, Agent, or Firm* — Locke Lord LLP; Tim Tingkang Xia, Esq.

(57) ABSTRACT

This invention relates to method and system for forming a film. The method including providing a trough containing water defining an air-water interface between air and the water; providing a solution containing a material of interest; and electrospraying the solution onto the air-water interface of water to form a film of the material of interest at the air-water interface. The system includes a trough containing water defining an air-water interface between air and the water; and means for spreading a solution containing a material of interest onto the air-water interface of water by electrospray, to form a film of the material of interest at the air-water interface. The spreading means comprises an electrospraying device.

10 Claims, 8 Drawing Sheets

(56) References Cited

OTHER PUBLICATIONS

Johnson, "Formation of Poly(diacetylene) Thin Films with Uniform Fluorescence", Langmuir 1995, 11, 1257-1260 (Year: 1995).*
Grunfeld, Review of Scientific Instruments 64, 548 (1993) (Year: 1993).*
Kenjiro Miyano (Rev Sci Instrum 58, 428-435 (1987)) (Year: 1987).*

* cited by examiner

METHOD AND SYSTEM FOR LANGMUIR-BLODGETT ASSEMBLY

CROSS-REFERENCE TO RELATED PATENT APPLICATIONS

This application is a divisional patent application of U.S. patent application Ser. No. 15/223,617, filed Jul. 29, 2016, which itself claims priority to and the benefit of, pursuant to 35 U.S.C. § 119(e), of U.S. provisional patent application Ser. No. 62/199,537, filed Jul. 31, 2015, entitled "ELECTROSPRAY ASSISTED LANGMUIR-BLODGETT COLLOIDAL ASSEMBLY USING WATER-MISCIBLE SPREADING SOLVENTS," by Jiaxing Huang and Huali Nie, which is incorporated herein by reference in its entirety.

Some references, which may include patents, patent applications and various publications, are cited in a reference list and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [10] represents the 10th reference cited in the reference list, namely, Huang, J. X., Tao, A. R., Connor, S., He, R. R. & Yang, P. D. A general method for assembling single colloidal particle lines. *Nano Lett.* 6, 524-529 (2006).

FIELD OF THE INVENTION

The invention relates generally to thin film fabrications, and more particularly, to method and system for electrospray assisted Langmuir-Blodgett colloidal assembly.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Langmuir-Blodgett (LB) assembly is a century-old material processing technique that was initially developed to create molecular monolayers [1-5]. In a typical process, the molecules are first dissolved in a volatile, water-immiscible organic solvent, and then spread onto water surface. A water-supported molecular monolayer is formed after the spreading solvent evaporates, which can be further compressed by barriers to obtain densely packed molecular thin films and transferred onto solid substrates [6]. Analogous to molecular LB assembly, monolayers of colloidal nanomaterials of diverse shapes and material compositions have been demonstrated [7-9]. When optimized, LB assembly allows continuous tuning of particle density, spacing, and even their relative orientations in a monolayer, as well as the number of layers in a stacked thin film. Due to such unparalleled capabilities of microstructural control, LB assembly has enabled the discovery of many exciting collective properties of nanoparticles [12-14], and has been employed to construct nanostructured thin films for device and coating applications [15-20].

Figure 6A:
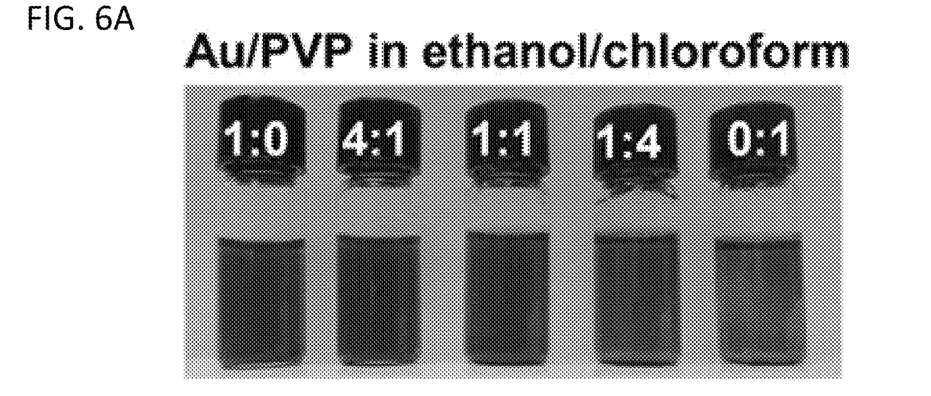
Figure 6B:
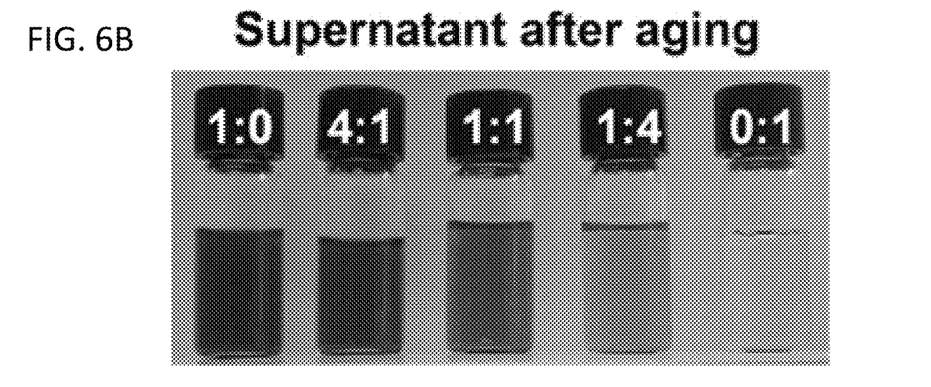
Figure 6C:
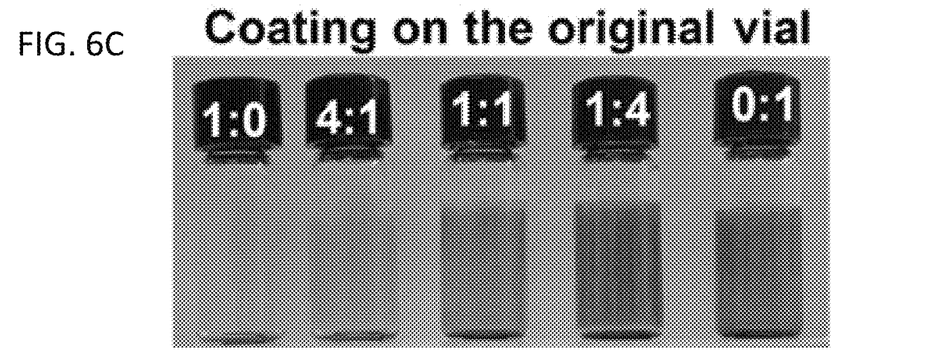

To maximize the benefit of LB assembly, the nanoparticles should be well dispersed in their initial solvent before assembly, and then also stay well dispersed in both the water-hating organic spreading solvent and on water during LB assembly. This is quite a dilemma since colloids typically need to have contrasting surface properties to disperse in organic solvents and water. If the starting stock solution is in a different solvent than the one for spreading, the challenges become even greater since the colloids need to be simultaneously stable, or re-functionalized several times to remain stable in three different solvents. Some surface functionalization agents do allow nanoparticles to disperse in both water and organic solvents, at least temporarily. For example, one of the best demonstrated examples of LB colloidal assembly is metal nanoparticles coated with polyvinylpyrrolidone (PVP) [7, 10, 11, 16, 21, 22]. Such nanoparticles, many have become commercially available, are typically synthesized in polyol solvents with PVP as the surface capping agent [23]. They disperse well in alcohol solvents after purification, and are usually stored and processed in methanol or ethanol. Since these alcohol solvents are completely miscible with water, usually water-immiscible solvents such as chloroform have to be added to make them more spreadable on water surface. Higher chloroform content improves spreading, but unfortunately makes the colloids much less stable as shown in FIGS. 6A-6C. The Au/PVP particles are only temporality dispersed in ethanol/chloroform mixtures, and they aggregate and deposit on the vial during storage. Uncontrolled particle aggregation disables the fine tuning capabilities of LB technique on the microstructures of the final monolayer. Therefore, one would have to prepare the spreading solution on-demand, and spread it immediately to avoid particle aggregation, which makes the process hard to standardize and scale up. In addition to the above-mentioned colloidal stability challenge, the use of organic spreading solvents also prevents the LB assembly of organic and polymeric nanostructures that can dissolve in those solvents. For example, polystyrene beads, a model system that has been routinely employed for colloidal assembly, can dissolve in common spreading solvents such as chloroform, methylene chloride and toluene, and therefore are very difficult to process by conventional LB technique.

The need for water-immiscible spreading solvent not only significantly increases the burden of pre-assembly material processing, but also strongly limits the capability and scope of LB assembly. There are additional concerns about their toxicity. The organic spreading solvents usually need to evaporate to create water-supported monolayer, which creates large volume of toxic vapors, posing a chemical threat to the heath of workers. Therefore, in scaled up operations, the cost associated with LB assembly would have to be significantly increased to include expenses in facilities and infrastructures addressing the chemical safety concerns originated from the use of toxic organic spreading solvents. All these problems can be solved if more benign, water-miscible solvents, such as alcohols are used for spreading.

Due to surface tension mismatch with water, alcohol droplets will partially spread on water surface before mixing. Indeed, they have been used to replace common spreading solvents for LB assembly of polymer colloids [24-27] and graphene oxide sheets [19, 28] that would otherwise dissolve or aggregate. However, the obvious disadvantage of alcohol solvents is their intermixing with water, which tends to lose the majority of the spreading materials to the water subphase [27]. In addition, the mixing behaviors of alcohol and water are quite complex, and strongly dependent on the local alcohol concentration beneath the spreading droplets, which is also dynamically changing. Therefore, spreading with alcohol solvents is not only a compromise between maintaining colloidal dispersity and suffering very low yield of surface deposition, but also difficult to standardize.

Figure 7A:
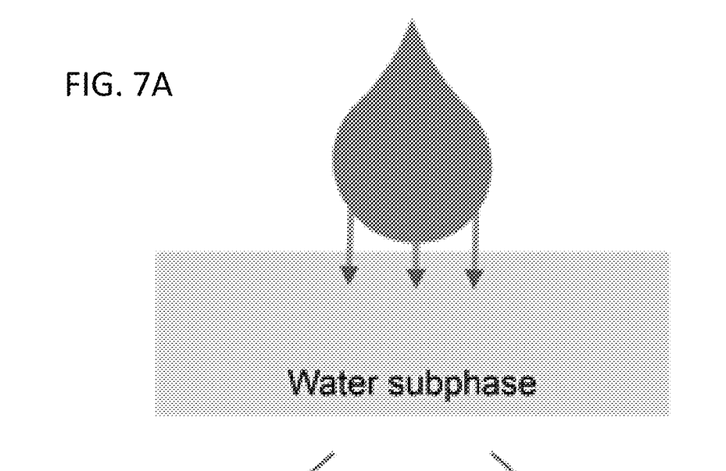
Figure 7B:
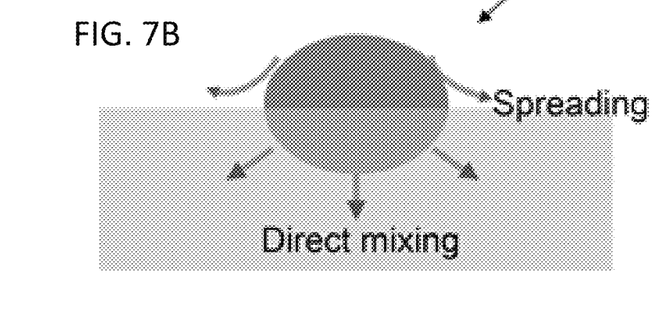
Figure 7C:
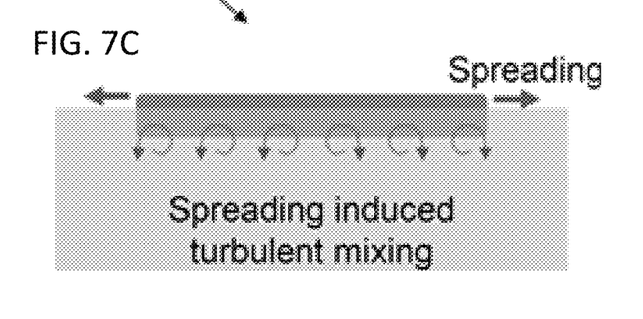
Figure 8:
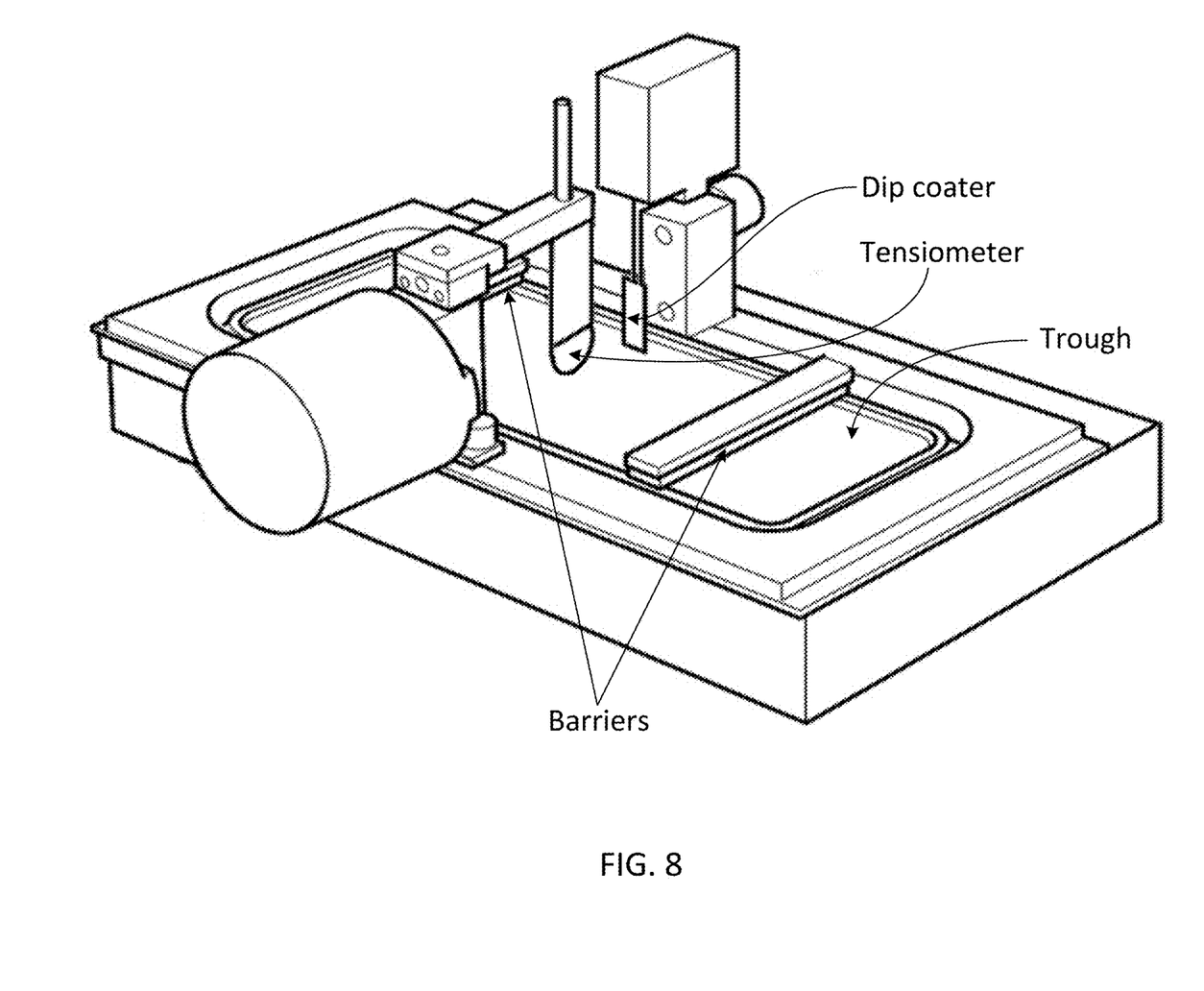
FIG. 8 show schematically a system for forming a film with a trough equipped with a tensiometer and a dip coater according to one embodiment of the invention.

If the intermixing problem of water-miscible solvents can be solved, LB assembly will become significantly easier, more standardizable, more scalable and greener. Taking ethanol for example, when a droplet is dispensed onto water surface under gravity, it can mix with water in two ways. If the droplet is bombarding the water surface, as shown in FIG. 7A, a large portion of its volume will submerge and directly mix with water, as shown in FIG. 7B. This type of mixing can be significantly reduced by some skillful dispensing methods, such as gently releasing the droplets by dragging on water surface. Since the density of ethanol is lower than water, careful dispensing will increase the retention time of the freshly dispensed ethanol near water surface, thus increasing the degree of spreading. However, such techniques cannot mitigate spreading-induced turbulent mixing, as shown in FIG. 7C. The initial spreading step induces turbulent flows right beneath the water surface, which then escalates the mixing of the remaining ethanol with water [29]. From the above analysis, it becomes clear that even careful dispensing cannot solve the problem of intermixing. Therefore, although LB assembly with water-miscible spreading solvents is possible, it tends to waste most of the materials, and has been hard to standardize.

Therefore, a heretofore unaddressed need exists in the art to address the aforementioned deficiencies and inadequacies.

SUMMARY OF THE INVENTION

One of the objectives of this invention is to solve the intermixing problem by reducing the size of the droplets. If the size or volume of the droplets is drastically reduced, they will be insensitive to gravity and they will be completely depleted during the initial spreading step, thus avoiding both types of intermixing altogether. In the other words, mixing can be minimized when there is not much left to mix.

In certain aspects, the invention discloses that aerosolized droplets of short-chain alcohols, such as methanol, ethanol, propanol, isopropanol, their mixtures with water and even water itself can effectively spread colloidal materials on the water surface (i.e., an air-water interface between the air and the water) with no visible materials loss to the water subphase. Since spreading water-miscible solvents on water results in a net reduction of surface tension or surface energy, all water-miscible solvents should be able to spread on water. Therefore, the invention can be extended to LB assembly of colloids dispersed in other water-miscible solvents.

Electrospray is chosen over other aerosol generation techniques based on ultrasound or compressed air to nebulize the spreading solution, because it does not involve air flows that disturb the water surface, and its electrical field helps to direct and confine the aerosol droplets in a given area on the LB trough. While the diameter of droplets dispensed by pipettes or syringes is typically a few millimeters, the diameter of electrosprayed droplets is typically in the micron to sub-micron scale. Due to solvent evaporation, these aerosolized droplets could become even smaller when they arrive at water surface. Therefore, electrospray can readily reduce the volume of spreading droplets by over 6 orders of magnitude.

In one aspect of the invention, a method for forming a film includes providing a trough containing water defining an air-water interface between air and the water; providing a solution containing a material of interest; and electrospraying the solution onto the air-water interface of water to form a film of the material of interest at the air-water interface.

In one embodiment, the method further includes transferring the film to a solid substrate.

In one embodiment, the solution contains a dispersion of the material of interest in water, a water-miscible solvent, or a mixture of them.

In one embodiment, the solution contains a stock solution of the material of interest. In another embodiment, the solution further contains ethanol or other chosen water-miscible spreading solvents added into the stock solution of the material of interest in water.

In one embodiment, the stock solution contains a water-miscible solvent. In one embodiment, the stock solution of the material of interest is devoid of a surface medication or a solvent exchange.

In one embodiment, the solution contains aqueous colloidal dispersions.

In one embodiment, the solution contains Au/polyvinylpyrrolidone (PVP) particles, polystyrene (PS) beads, polyaniline (PANI) nanofibers, graphene oxide (GO) sheets, nanoparticles of other materials, or biological colloids.

In one embodiment, the film is of a monolayer.

In another aspect, the invention relates to a method for forming a film. The method comprises providing a solution containing a material of interest; and spreading the solution onto an air-water interface of water, without producing air flow to disturb the air-water interface, to form a film of the material of interest at the air-water interface.

In one embodiment, the method further includes transferring the film to a solid substrate.

In one embodiment, the spreading step comprises nebulizing the solution, and the spreading step is performed with electrospraying.

In one embodiment, the solution contains a dispersion of the material of interest in water, a water-miscible solvent, or a mixture of them.

In one embodiment, the solution contains a stock solution of the material of interest. In another embodiment, the solution further contains ethanol added into the stock solution of the material of interest in water.

In one embodiment, the stock solution contains a water-immiscible solvent. In one embodiment, the stock solution of the material of interest is devoid of a surface medication or a solvent exchange.

In one embodiment, the solution contains aqueous colloidal dispersions.

In one embodiment, the solution contains Au/PVP particles, PS beads, PANI nanofibers, GO sheets, nanoparticles, or biological colloids.

In one embodiment, the film is of a monolayer.

In certain aspects, the invention relates to an article comprising the film formed according to the above disclosed methods.

In one aspect of the invention, a system for forming a film has a trough containing water defining an air-water interface between air and the water; and means for spreading a solution containing a material of interest onto the air-water interface of water, without producing air flow to disturb the air-water interface, to form a film of the material of interest at the air-water interface.

In one embodiment, the spreading means comprises an electrospraying device.

In one embodiment, the electrospraying device comprises a syringe, connected to a syringe pump to control the flow rate, having a needle connected to a power supply, and operably positioned above the air-water interface.

In one embodiment, the system further has a grounding wire submerged in the water subphase.

In one embodiment, the solution contains a dispersion of the material of interest in water, a water-miscible solvent, or a mixture of them.

In one embodiment, the solution contains a stock solution of the material of interest. In another embodiment, the solution further contains ethanol added into the stock solution of the material of interest in water.

In one embodiment, the stock solution contains a water-immiscible solvent. In one embodiment, the stock solution of the material of interest is devoid of a surface medication or a solvent exchange.

In one embodiment, the solution contains aqueous colloidal dispersions.

In one embodiment, the solution contains Au/PVP particles, PS beads, PANI nanofibers, GO sheets, nanoparticles, or biological colloids.

In one embodiment, the film is of a monolayer.

These and other aspects of the invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

FIG. 1A shows that spreading with water-miscible solvents normally results in mixing with the subphase with very little material left on water surface. FIG. 1B shows that this problem can be solved by aerosolizing the spreading solvent, such as using electrospraying, according to one embodiment of the invention. The volume of the droplets can thus be readily depleted during spreading, leaving no extra solvent for mixing. FIG. 1C shows a photo showing uniform color of the water subphase after spreading an ethanol dispersion of Au nanoparticles with a dropper. FIG. 1D shows that, in contrast, electrospray can selectively spread Au nanoparticles on water surface (i.e., the air-water interface) with no visible color in the subphase (also see the area outside the two barriers), according to one embodiment of the invention. The opening in the Au LB monolayer, located right beneath the spraying nozzle, was caused by the spreading of ethanol aerosol droplets. As more materials are deposited, it would gradually shrink and eventually close as the surface pressure builds up.

FIGS. 2A-2D show Au/PVP nanoparticle LB monolayer prepared by electrospray spreading using ethanol, according to one embodiment of the invention. Here it is challenging to use common spreading solvents such as chloroform and toluene due to poor colloidal stability of Au/PVP in these solvents. FIG. 2A is isothermal surface pressure/area curve (solid line) showing that electrospray spreading indeed produced a surface monolayer, while conventional drop spreading (dashed line) of equal volume of dispersion did not leave detectable amount of material on the surface. The surface pressure remains near zero even after the two barriers are closed. FIGS. 2B-2D show photos of the Au LB monolayer at increased surface pressures, as marked in FIG. 2A. The transparent blue monolayer eventually turned into a highly reflective golden film, indicating close packing of Au nanoparticles. FIGS. 2E-2G are SEM images of the Au monolayer, corresponding to the photos FIGS. 2B-2D, respectively, after being transferred to Si wafer by dip coating. The scale bars in the insets represent 100 nm.

FIGS. 3A-3G show schematically electrospray assisted LB assembly of polystyrene (PS) colloids using ethanol as the spreading solvent, according to one embodiment of the invention. Here common spreading solvents cannot be used because they will dissolve these polymer colloids. FIGS. 3A-3D are photos showing a monolayer of close-packed PS colloids on Si wafer viewed at different angles. SEM images, as shown in FIGS. 3E and 3G, and optical microscopy image, as shown in FIG. 3F, confirm the monolayer nature of the PS film.

FIGS. 4A-4E show schematically spreading water-dispersed colloids directly on water by electrospray using graphene oxide (GO) as an example, according to one embodiment of the invention. FIG. 4A shows that GO sheets could migrate to the surface of water droplets due to their amphiphilic nature, which can then spread when the droplets impinge the water surface. Aerosolized droplets have much higher surface area, thus resulting in much higher spreading yield. FIG. 4B is isothermal surface pressure/area curves confirm that electrospray spreading is very effective in placing GO on water surface (solid black line), while conventional drop spreading failed (red dashed line). FIGS. 4C and 4D shows SEM images of GO monolayers collected on Si wafer at increasing surface pressures as marked in FIG. 4B.

FIGS. 5A-5G show schematically simultaneous purification and LB assembly of polyaniline nanofibers right after synthesis, according to one embodiment of the invention. FIG. 5A is a photo showing vials containing (1) as-made polyaniline nanofibers before any purification, (2) polyaniline nanofibers purified by centrifugation, and (3) the corresponding supernatant containing polymerization byproducts. FIGS. 5B-5D are photos showing an LB film of polyaniline nanofibers being compressed by two barriers, prepared by electrospray spreading directly from the unpurified product (1). FIG. 5E shows, in contrast, conventional drop spreading failed to deposit material on water surface. FIG. 5F is UV/vis spectra of the collected polyaniline LB film, together with those of solution (1) and (3), showing that the LB film has also been purified. FIG. 5G is an SEM image showing a monolayer of the nanofibers collected by dip coating. The inset is a photo of a glass slide half coated with a nanofiber monolayer.

FIGS. 6A-6C show spreading water-miscible solvent on water is inefficient due to extensive degree of mixing. Direct mixing occurs when (FIG. 6A) a dispersed droplet is (FIG. 6B) partially or fully submerged in the water subphase (FIG. 6C). Careful dispersing can reduce the degree of direct mixing and allow more spreading. However, spreading itself induces and escalates turbulent mixing as the solvent spreads.

FIGS. 7A-7C show schematically the dilemma of dispersing solvent versus spreading solvent. An example illustrating the colloidal stability challenge and dilemma during LB assembly. Au/PVP nanoparticles are stable in ethanol solution, which is water-miscible and not suitable for spreading. A common strategy to make them spreadable is to add a spreading solvent, such as chloroform to their dispersion, or exchange the solvent entirely to chloroform. However, this results in significantly decreased colloidal stability. FIGS. 7A-7C clearly show that Au/PVP nanoparticles are highly stable in ethanol, but become increasingly less dispersible (and more likely to deposit on the vials) as the fraction of chloroform increases.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the phrase "at least one of A, B, and C" should be construed to mean a logical (A or B or C), using a non-exclusive logical OR. It should be understood that one or more operations within a method is executed in different order (or concurrently) without altering the principles of the invention.

Embodiments of the invention are illustrated in detail hereinafter with reference to accompanying drawings. It should be understood that specific embodiments described herein are merely intended to explain the invention, but not intended to limit the invention. In accordance with the purposes of this invention, as embodied and broadly described herein, this invention, in certain aspects, relates to systems and methods for electrospray assisted Langmuir-Blodgett colloidal assembly using water-miscible spreading solvents.

Langmuir-Blodgett (LB) assembly is a classical molecular thin film processing technique, in which the material is spread onto water surface from a volatile, water-immiscible solvent to create floating monolayers that can be later transferred to solid substrates. LB has also been applied to prepare colloidal thin films with unparalleled level of microstructural control and thickness, which has enabled the discovery of many exciting collective properties of nanoparticles and the construction of bulk nanostructured materials. To maximize the benefits of LB assembly, the nanoparticles should be well dispersed in their initial solvent before assembly, and later in both the water-hating organic spreading solvent and on water during LB assembly. This is quite challenging since colloids usually need contrasting surface properties in order to be stable in the water-hating organic solvents and on water surface. In addition, many organic and polymeric nanostructures dissolve in those organic solvents and cannot be processed directly. In scaled up operations, the use of toxic spreading solvents also poses a significant chemical safety threat, and would require significantly increased cost to mitigate such threat. Using water-liking spreading solvents can avoid all these problems. However, the obvious disadvantage is that it could lose most of the materials to the water subphase due to mixing.

This invention discloses, among other things, an electrospray-assisted LB assembly technique that can achieve high yield spreading of nanoparticles directly from water-miscible solvents without the problem of intermixing. The new strategy drastically reduces the burden of material processing prior to assembly, and broadens the scope of LB assembly to previously hard-to-process materials. It also avoids the use of toxic volatile organic spreading solvents, improves the reproducibility and can be readily automated, making LB assembly safer and more suitable as a manufacturing tool for nanoparticle applications.

Accordingly to the invention, aerosolized droplets of short-chain alcohols, such as methanol, ethanol, propanol, isopropanol, their mixtures with water, and even water itself can effectively spread colloidal materials on a water surface with no visible materials loss to the water subphase. Since spreading water-miscible solvents on water results in a net reduction of surface energy, all water-miscible solvents should be able to spread on water. Therefore, the invention can be extended to LB assembly of colloids dispersed in other water-miscible solvents. In certain embodiments, electrospray is chosen over other aerosol generation techniques based on ultrasound or compressed air to nebulize the spreading solution, because it does not involve air flows that disturb the water surface, and its electrical field helps to direct and confine the aerosol droplets in a given area on the LB trough. While the diameter of droplets dispensed by pipettes or syringes is typically a few millimeters, the diameter of electrosprayed droplets is typically in the micron to sub-micron scale. If the size or volume of the droplets is drastically reduced, they are insensitive to gravity and they are completely depleted during the initial spreading step, thus avoiding both types of intermixing altogether. In the other words, mixing can be minimized when there is not much left to mix. Due to solvent evaporation, these aerosolized droplets could become even smaller when they arrive at water surface. Therefore, electrospray can readily reduce the volume of spreading droplets by over 6 orders of magnitude.

In one aspect of the invention, a method for forming a film includes providing a trough containing water defining an air-water interface between air and the water; providing a solution containing a material of interest; and electrospraying the solution onto the air-water interface of water to form a film of the material of interest at the air-water interface.

In one embodiment, the method further includes transferring the film to a solid substrate.

In one embodiment, the solution contains a dispersion of the material of interest in water, a water-miscible solvent, or a mixture of them.

In one embodiment, the solution contains a stock solution of the material of interest. In another embodiment, the solution further contains ethanol added into the stock solution of the material of interest in water.

In one embodiment, the stock solution contains a water-miscible solvent. In one embodiment, the stock solution of the material of interest is devoid of a surface medication or a solvent exchange.

In one embodiment, the solution contains aqueous colloidal dispersions.

In one embodiment, the solution contains Au/PVP particles, PS beads, PANI nanofibers, GO sheets, nanoparticles, or biological colloids.

In one embodiment, the film is of a monolayer.

In another aspect, the invention relates to a method for forming a film. The method comprises providing a solution containing a material of interest; and spreading the solution onto an air-water interface of water, without producing air flow to disturb the air-water interface, to form a film of the material of interest at the air-water interface.

In one embodiment, the method further includes transferring the film to a solid substrate.

In one embodiment, the spreading step comprises nebulizing the solution, and the spreading step is performed with electrospraying.

In one embodiment, the solution contains a dispersion of the material of interest in water, a water-miscible solvent, or a mixture of them.

In one embodiment, the solution contains a stock solution of the material of interest. In another embodiment, the solution further contains ethanol added into the stock solution of the material of interest in water.

In one embodiment, the stock solution contains a water-immiscible solvent. In one embodiment, the stock solution of the material of interest is devoid of a surface medication or a solvent exchange.

In one embodiment, the solution contains aqueous colloidal dispersions.

In one embodiment, the solution contains Au/PVP particles, PS beads, PANI nanofibers, GO sheets, nanoparticles of other materials, or biological colloids.

In one embodiment, the film is of a monolayer.

In certain aspects, the invention relates to an article comprising the film formed according to the above disclosed methods.

In one aspect of the invention, a system for forming a film has a trough containing water defining an air-water interface between air and the water; and means for spreading a solution containing a material of interest onto the air-water interface of water, without producing air flow to disturb the air-water interface, to form a film of the material of interest at the air-water interface.

In one embodiment, the spreading means comprises an electrospraying device.

In one embodiment, the electrospraying device comprises a syringe, connected to a syringe pump to control the flow rate, having a needle connected to a power supply, and operably positioned above the air-water interface.

In one embodiment, the system further has a grounding wire submerged in the water subphase.

In one embodiment, the solution contains a dispersion of the material of interest in water, a water-miscible solvent, or a mixture of them.

In one embodiment, the solution contains a stock solution of the material of interest. In another embodiment, the solution further contains ethanol added into the stock solution of the material of interest in water.

In one embodiment, the stock solution contains a water-immiscible solvent. In one embodiment, the stock solution of the material of interest is devoid of a surface medication or a solvent exchange.

In one embodiment, the solution contains aqueous colloidal dispersions.

In one embodiment, the solution contains Au/PVP particles, PS beads, PANI nanofibers, GO sheets, nanoparticles, or biological colloids.

In one embodiment, the film is of a monolayer.

Figure 1A:
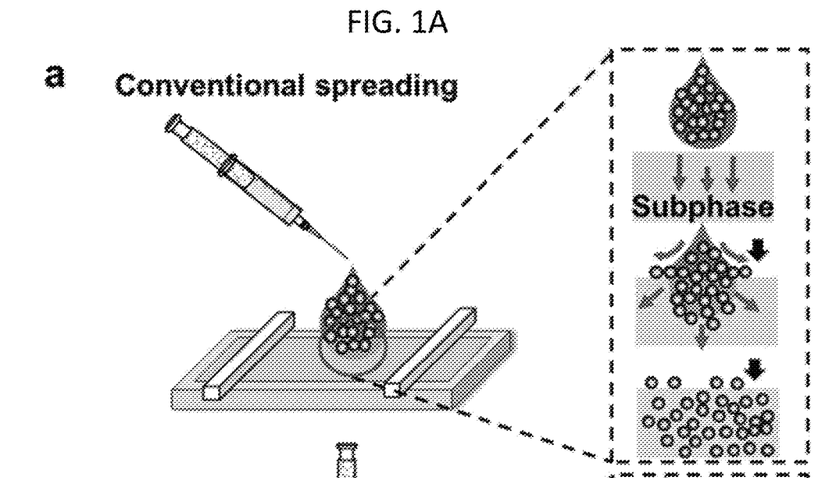
FIGS. 1A-1D show schematically electrospray enabled high yield spreading of colloids on water surface from their dispersion in water-miscible solvents.
Figure 1B:
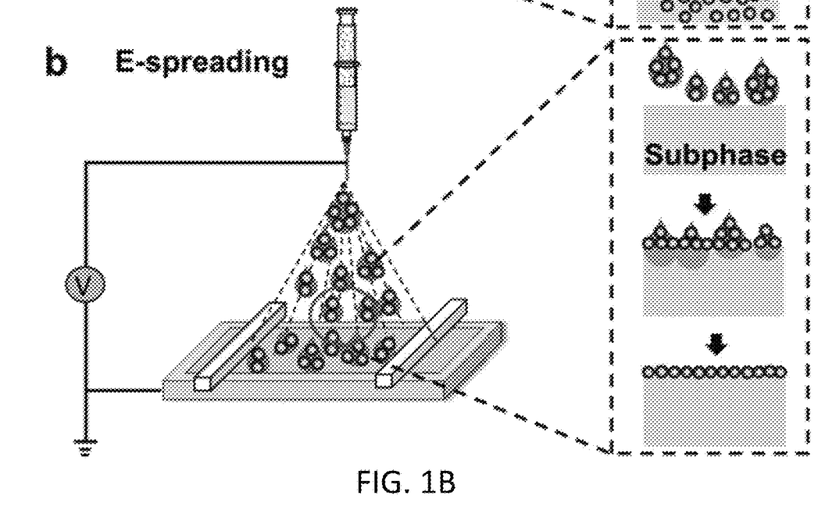
Figure 1C:
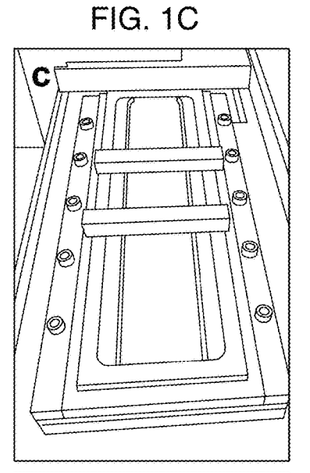
Figure 1D:
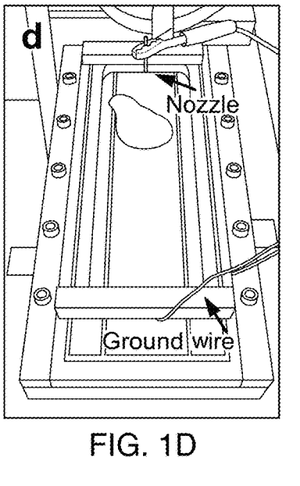
Figure 2A:
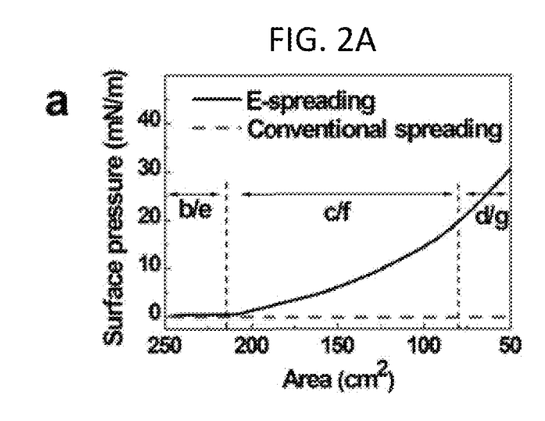
Figure 2B:
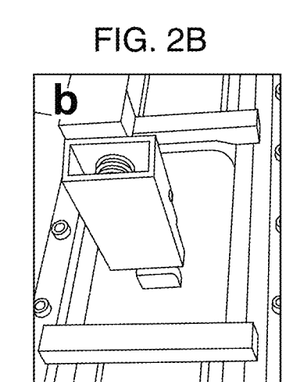
Figure 2C:
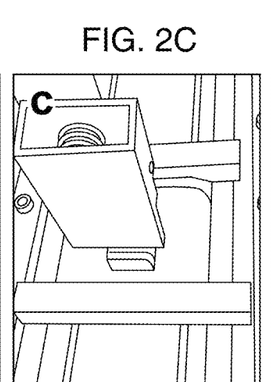
Figure 2D:
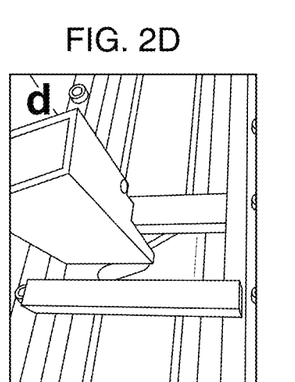
Figure 2E:
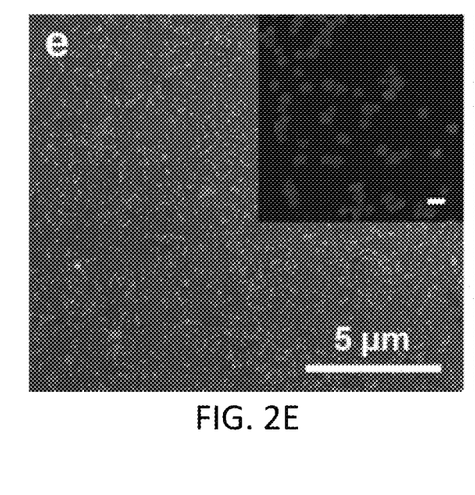
Figure 2F:
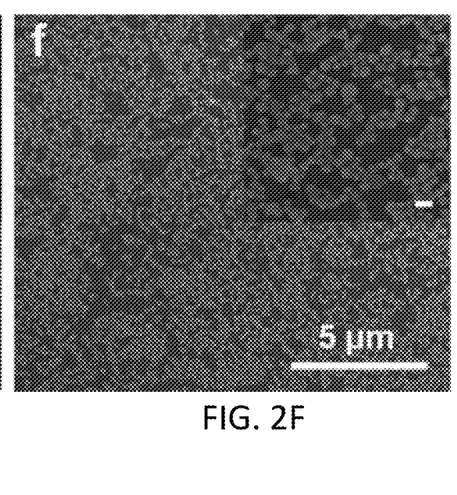
Figure 2G:
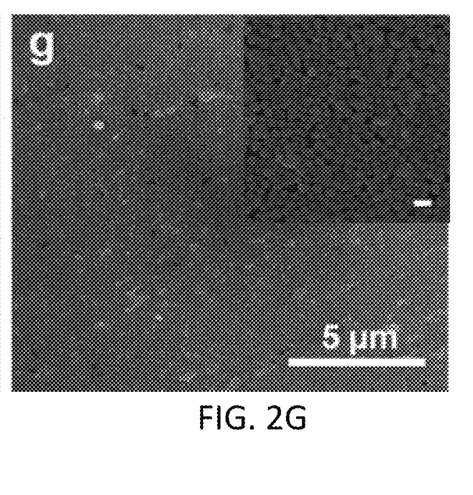
Figure 3A:
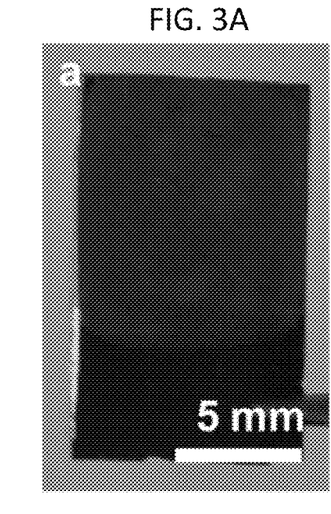
Figure 3B:
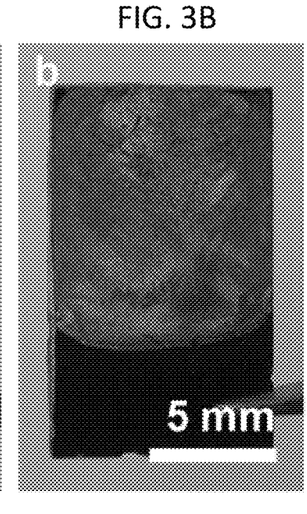
Figure 3C:
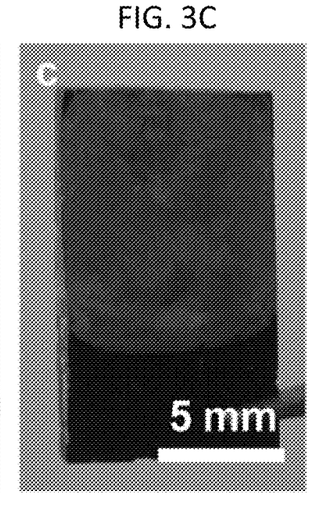
Figure 3D:
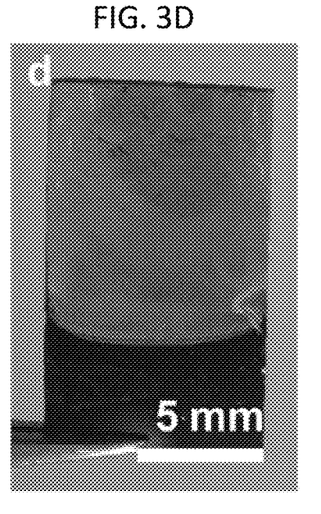
Figure 3E:
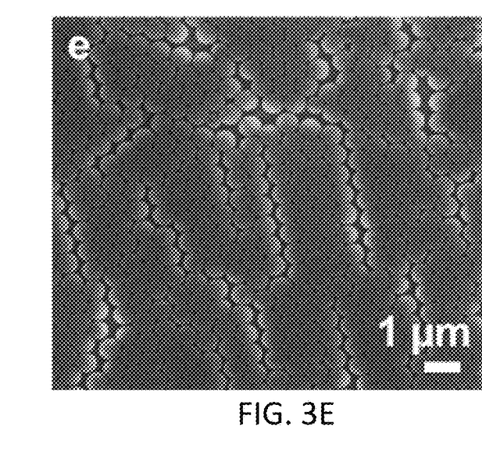
Figure 3F:
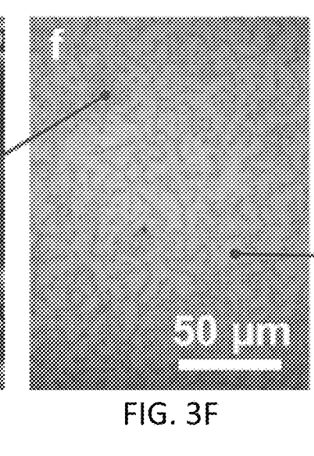
Figure 3G:
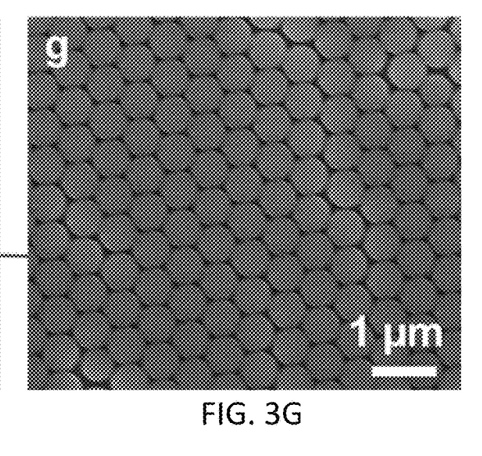

Without intent to limit the scope of the invention, examples according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Materials

All chemicals, except for graphite powders (Bay Carbon, SP-1) were purchased from Sigma Aldrich and used as received. All the water used in these examples was deionized. Three model colloids were chosen in these examples. Au/PVP nanoparticles were synthesized by a polyol route in ethylene glycol using PVP as the capping agent, purified by multiple centrifugation steps, and stored in ethanol [32]. Polystyrene colloids were synthesized by a surfactant-free route as reported previously, and stored in water [33]. Graphene oxide sheets were synthesized based on a modified Hummers method [34], purified by a two-step washing procedure [35-37], and stored in water.

LB Assembly

All the isothermal surface pressure/area plots were recorded on a NIMA 116 LB trough (10 cm×250 cm) equipped with a tensiometer and a dip coater. Some experiments were performed on a homemade mini LB trough (2.5 cm×13 cm) as shown in FIGS. 1A-1D, 2A-2G and 5A-5G. As schematically shown in FIG. 8, the trough is equipped with a tensiometer and a dip coater for recording an isothermal surface pressure-area curve of the film formed in the area. Conventional drop spreading was done with a glass syringe. As shown in FIGS. 1B and 1D, for electrospray spreading, the syringe was used for nebulizing the spreading solution, which was connected to a syringe pump to control the flow rate. The metal needle was connected to a power supply (Series EH, Glassman High Voltage, Inc.) set at 10 kV, and positioned at about 2.5 cm above the water surface (the air-water interface). A copper grounding wire is submerged in the water subphase from the area outside the two barriers (FIG. 1D). The typical spray time is about 10-40 minutes. A feed rate of 2.0 ml/h was used to electrospray ethanol or ethanol/water mixtures for Au/PVP, polystyrene beads, PANI nanofibers and GO sheets. For spreading GO sheets from their aqueous dispersion on water, as shown in FIGS. 4A-4E, the flow rate was reduced to 0.5 ml/h.

Characterization

All monolayers were transferred to Si wafers for SEM (Hitachi FE-SEM S4800) or optical microscopy (Nikon E600) observations by dip coating (pulling speed 2 mm/min). The PANI monolayer on glass slide was first dissolved in N-methyl-pyrrolidone before taking its UV/vis spectrum (Agilent 8453).

Results and Discussions

Conventional drop spreading vs. electrospray spreading (E-spreading): To compare the efficacy of conventional drop spreading and E-spreading, Au/PVP particles dispersed in ethanol were chosen as the model system. These particles are around 50 nm in diameter and are strongly colored, so they can serve as markers for visual distinction of spreading versus mixing. Conventional spreading was done by dispensing the particles with a glass syringe, which produced droplets of around 3-5 mm in diameter. As illustrated by FIG. 1A, droplets were dispensed in the area between the two moving barriers, which can be closed or opened to tune the particle packing density on the surface. If water outside the area defined by barriers becomes colored, it suggests that significant mixing has occurred. When such large droplets are placed on water surface, intermixing becomes the dominating process, which brings most of the nanoparticles down to the water subphase. Indeed, as shown in the photo in FIG. 1C, even after the two barriers were closed to densify the surface materials, the color of water outside or inside the barriers was still indistinguishable, which confirmed that only negligible amount of Au/PVP particles were on the surface. In contrast, when electrospray was employed for spreading the ethanol dispersion, the Au/PVP nanoparticles were exclusively deposited on the water surface (i.e., the air-water interface). As mentioned earlier, electrospray reduces the volume of ethanol droplets by many orders of magnitude. Their volume can be depleted during initial spreading, thus leaving all the nanoparticles on the water surface, as shown in FIG. 1B. The photo shown in FIG. 1D captured a moment during E-spreading. The formation of a water-supported Au/PVP film is evident. The area of water outside the two barriers was clear, suggesting that no obvious intermixing. An alternative explanation of is that the ethanol aerosol droplets may have completely evaporated before they reach water surface; and the Au/PVP particles are already dried when they land on water and trapped by surface tension. However, FIG. 1D shows that there was a large opening in the monolayer right underneath the spraying nozzle. This is due to the spreading of the ethanol aerosol droplets, which pushes the Au/PVP particles away. Therefore, according to the experiments, the ethanol aerosol droplets were still wet when they arrived at water surface, which confirms the earlier hypothesis of the effect of ethanol droplet size on spreading.

Unstable colloids: Electrospray assisted LB assembly can avoid the use of water-immiscible spreading solvents, in which many colloids are unstable. FIGS. 2A-2G show the LB assembly of Au/PVP after E-spreading. The isothermal surface pressure-area plot shown in FIG. 2A confirms the efficacy of E-spreading. For conventional drop spreading, even after the barriers are fully closed, no observation increase in surface pressure can be noted (dashed line) because there was very little material on the water surface. When the E-spread monolayer was compressed by the two barriers, its blue color continuously intensified, as shown in FIGS. 2B and 2C. Eventually the monolayer turned into a highly reflective golden film, suggesting close packing of the gold nanoparticles, as shown in FIG. 2D. The monolayer was transferred to Si wafers at the moments shown in FIGS. 2B-2D by dip coating, and the corresponding scanning electron microscopy (SEM) images shown in FIGS. 2E-2G confirm that the E-spread particles indeed formed a monolayer, which was gradually densified to reach the final close packed state. The Au/PVP model system represents a large group of colloidal materials that are usually stored and processed in water-immiscible solvents such as alcohols and some polar aprotic solvents including tetrahydrofuran, dimethyl sulfoxide, dimethylformamide and N-methyl-pyrrolidone. They usually becomes unstable in common water-immiscible spreading solvents, making their LB assembly difficult. Electrospray now allows them to be spread directly from their stock solution without the need for extra surface modification or solvent exchange.

Soluble polymer or organic colloids: E-spreading now enables LB assembly of particles that would be dissolved in conventional spreading solvents. The need for volatile water-immiscible spreading solvents precludes the LB assembly of many organic and polymer colloids that are soluble or extensively reconfigured in those solvents. Latex beads, a model system in colloidal assembly, is one of such examples. These polystyrene (PS) nanospheres can disperse in water and alcohol solvents, but dissolve in common spreading solvents. LB assembly would be a very good tool to create their close packed monolayers over large areas, which can be very useful for photonics [29] and lithography applications [30-32]. However, LB assembly of such polymer colloids has been limited, and has usually been done by drop spreading from alcohol solvents [25-27], which suffers from with great material loss [27]. There have been a number of strategies to mitigate material loss. For example, using long chain alcohols that are less soluble in water can reduce the degree of intermixing. But these solvents tends to compromise colloidal stability and are much less volatile or soluble in water. One could also significantly increase the particle concentration in the spreading solvents, so that eventually sufficient quantity of materials can be accumulated on water surface to produce a monolayer, even if the material loss is high. Alternatively, a carefully formulated cocktail of water, alcohol and another common spreading solvent is needed to improve spreading, suppress mixing, while maintaining colloidal stability [27]. E-spreading avoids all these dilemmas. FIGS. 3A-3G show monolayers of polystyrene beads with diameter of around 300 nm obtained by E-spreading assisted LB assembly. The spreading solution was prepared by simply adding equal volume of a water-miscible solvent such as ethanol to their stock solution in water. Again surface pressure readings confirmed highly selective surface deposition on water surface by E-spreading, while conventional drop spreading was far less effective. The photos shown in FIGS. 3A-3D illustrate the collected monolayer on a Si wafer at different viewing angles. The film exhibited angle dependent colors, which is characteristics for close-packed colloidal crystals. The optical image (FIG. 3F) and SEM images (FIGS. 3A and 3G) confirmed that the colloidal film was indeed a high density monolayer extended over the entire deposited area, with line defects separating single crystalline domains that are typically made of hundreds to thousands of particles.

Figure 4A:
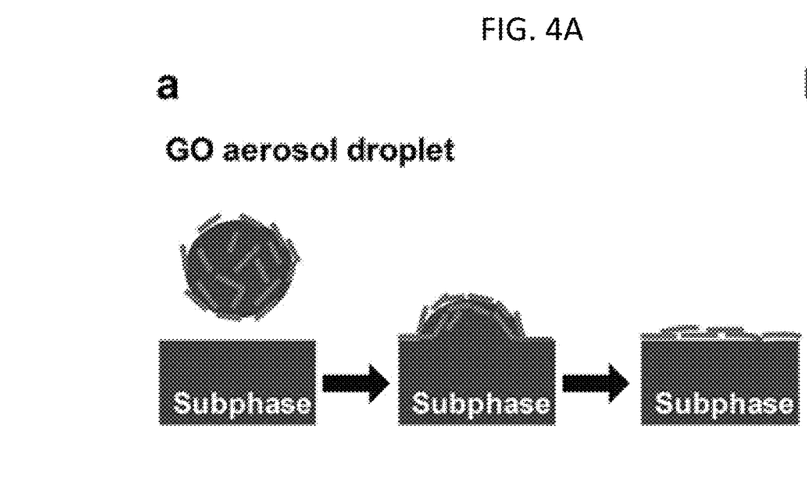
Figure 4B:
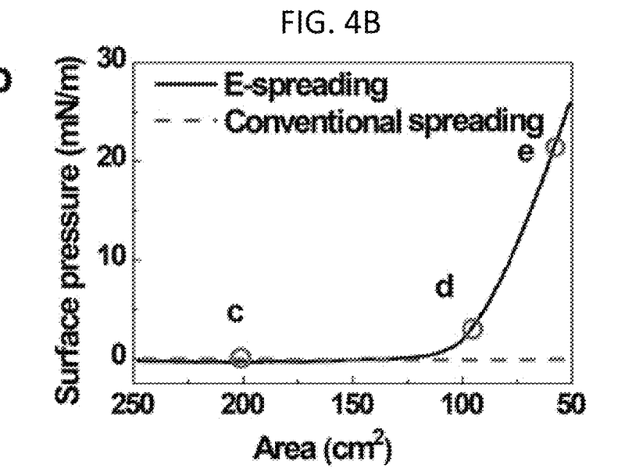
Figure 4C:
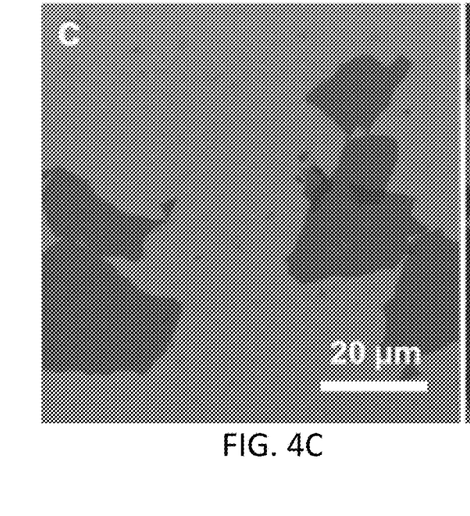
Figure 4D:
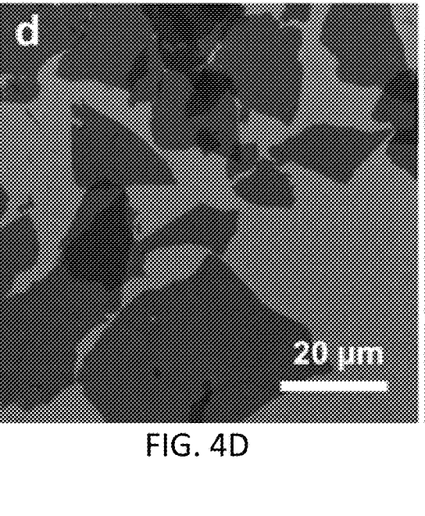
Figure 4E:
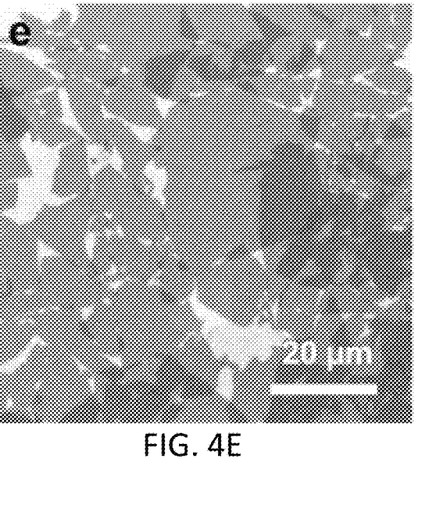
Figure 5A:
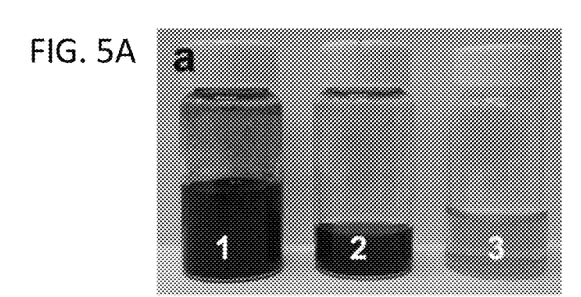
Figure 5B:
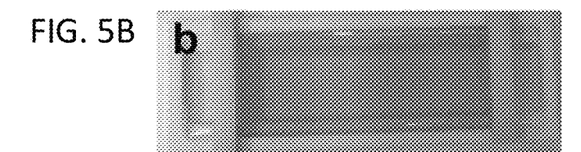
Figure 5C:
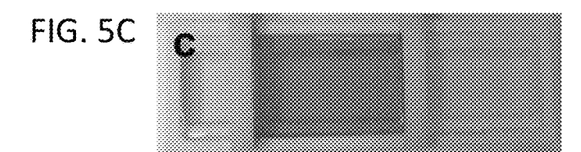
Figure 5D:
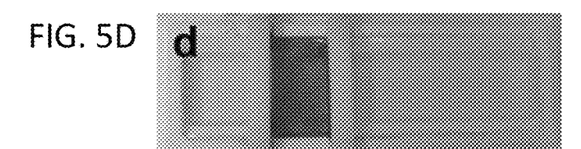
Figure 5E:
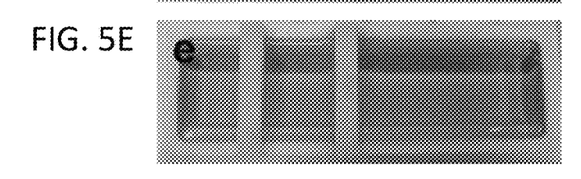
Figure 5F:
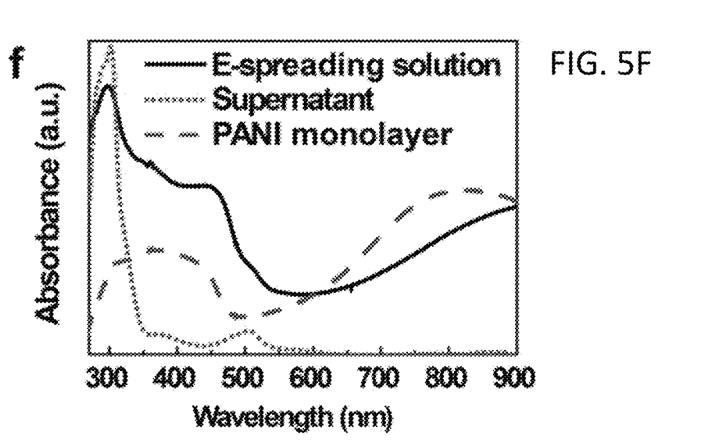
Figure 5G:
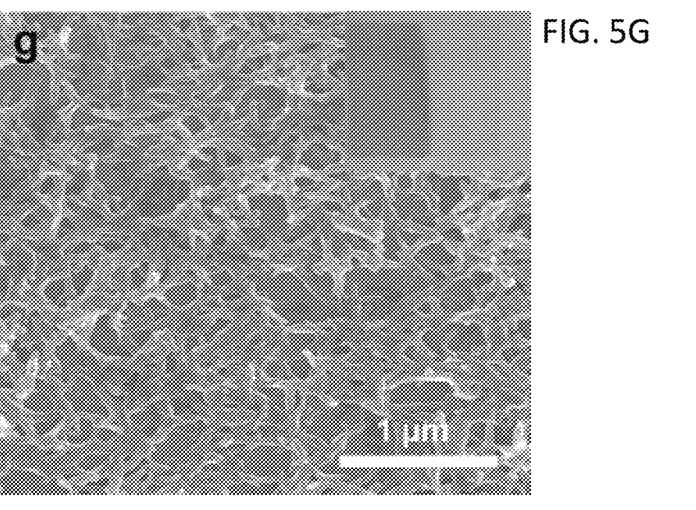

E-spreading of water on water: The extraordinary capability of electrospray for spreading materials on water surface can be demonstrated by using water itself as the spreading solvent. One of such examples is graphene oxide (GO) sheets, which disperse best in water, but can stay at the air/water interface when spread onto water surface. Since GO sheets do not disperse well in the common weakly polar spreading solvents, LB assembly of GO sheets has relied on the use of water/alcohol mixture as the spreading solvent, which has resulted in very low yield [19, 28]. As expected, using electrospray can drastically reduce the volume of spreading solution for LB assembly. However, according to embodiments of the invention, even water itself can act as spreading solvent. As illustrated in FIG. 4A, GO sheets could accumulate at the surface of water droplets due to their amphiphilic nature [33, 34]. When these GO wrapped droplets mix with water, the sheets on surface could readily spread. Common droplets dispensed by pipette or syringe have very small surface area, therefore, cannot produce discernable amount of GO on the surface (FIG. 4B, dashed line). With orders of magnitude enhanced surface area, the aerosolized droplets become much effective in producing a GO monolayer on water (FIG. 4B, solid line). FIGS. 4C-4E are SEM images of GO monolayer collected at increasing surface pressure zones as marked in FIG. 4B. A transition from dilute, well isolated flat sheets to density titled, partially overlapped sheets is observed, similar to the results produced in previous LB experiments that needed to spread excessive volume of GO dispersion in water/alcohol mixture [19].

The experiment shown above is a proof-of-concept that electrospray can indeed spread aqueous colloidal dispersions on water surface. In practice, many such aqueous colloids can remain stable when a small fraction of alcohol is added, so E-spreading can be more rapidly completed in such solvent mixtures. However, some amphiphilic macromolecular or biological colloids, such as proteins and cells may experience configurational change or lose their functionalities upon exposure to alcohol solutions. Therefore, direct spreading from water may become necessary to create highly uniform films without altering thin film properties.

Simultaneous material purification and LB assembly: Since electrospray makes it routine to use water-miscible spreading solvent, LB assembly can now be extended to perform simultaneous materials purification and assembly, further reducing the requirement of pre-assembly materials processing. Typically, colloidal materials need to be first purified to remove small molecular byproducts after synthesis, surface functionalized to disperse in a solvent, then if needed, solvent exchanged to perform LB assembly. In certain embodiments, for colloids synthesized in water-based solvents, the step of purification can be skipped. Adding alcohol solvents to the as-synthesized material makes it readily spreadable by electrospray. Small molecular byproducts can then dissolve in the water subphase, while the material of interest stay on the water surface waiting to be assembled and collected. This turns LB assembly a very effective and cost saving thin film processing technique. FIGS. 5A-5G show a proof of concept using polyaniline (PANI) nanofibers as an example. These nanofibers are made by oxidative polymerization of aniline under rapid mixing conditions [35]. After synthesis, the PANI product is mixed with many unwanted small molecules such as aniline oligomers, byproducts of aniline oxidation and the oxidant, and excess acid dopants. Typically the fibers need to be purified by centrifugation, dialysis or filtration with large amount of water [35]. FIG. 5A shows three vials containing as-synthesized PANI nanofibers diluted in ethanol, PANI nanofibers purified by centrifugation, and the pink colored supernatant containing byproducts. With E-spreading, the sample in vial 1 can be directly processed, without any sample purification step to make LB films. The photos of the trough in FIGS. 5B-5D clearly show selective surface deposition of PANI nanofibers, while conventional drop spreading failed, as shown in FIG. 5E. UV/vis spectra were taken of the spreading solution, the supernatant, and the resulting PANI monolayer, as shown in FIG. 5F, which confirm the removal of byproducts from the spreading solution after LB assembly. Consistently, only clean PANI fiber monolayer network is observed in the SEM image of the dip coated film on Si wafer, as shown in FIG. 5G.

LB assembly has been routinely used in research labs for nearly a century for preparing molecular and colloidal monolayers, yet it has not quite become a scalable manufacturing tool for nanomaterials. Volatile, water-immiscible solvents are convenient for spreading, but they also greatly limit the versatility of the assembly technique and bring environmental and safety concerns in scaled up applications. The use of water-miscible spreading solvents is not effective or reproducible, and tends to lose material to the water subphase due to intermixing. Electrospray spreading as disclosed in the invention solves the intermixing problems by depleting the volume of the droplets during spreading, thus leaving little solvent for mixing.

As demonstrated in the above exemplary embodiments, in the disclosure, in the invention presents, among other things, at least the following advantages over the existing processes electrospray allows high yield, high throughput spreading of colloidal materials on water surface using environmentally benign, water-miscible solvents, which liberates this century-old technique from many constrains related to material processing, and significantly expands its scope. Essentially any colloidal material that can float on water surface, even temporality, can now be processed by LB assembly. Therefore, it avoids the use of toxic organic solvents, and makes LB significantly easier, more standardizable, more scalable and greener. In addition, electrospray apparatus can be readily automated and fully integrated with existing LB systems, which helps to standardize and scale up this technique for manufacturing.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1]. Blodgett, K. B. Monomolecular films of fatty acids on glass. *J. Am. Chem. Soc.* 56, 495-495 (1934).

[2]. Blodgett, K. B. Films built by depositing successive monomolecular layers on a solid surface. *J. Am. Chem. Soc.* 57, 1007-1022 (1935).

[3]. Langmuir, I. & Blodgett, K. Über einige neue Methoden zur Untersuchung von monomolekularen Filmen. *Kolloid-Zeitschrift* 73, 257-263 (1935).

[4]. Gleiche, M., Chi, L. F. & Fuchs, H. Nanoscopic channel lattices with controlled anisotropic wetting. *Nature* 403, 173-175 (2000).

[5]. Collier, C. P., Wong, E. W., Belohradsky, M., Raymo, F. M., Stoddart, J. F., Kuekes, P. J., Williams, R. S. & Heath, J. R. Electronically configurable molecular-based logic gates. *Science* 285, 391-394 (1999).

[6]. Roberts, G. G. *Langmuir-Blodgett films*. (Plenum Press, 1990).

[7]. Tao, A. R., Huang, J. X. & Yang, P. D. Langmuir-Blodgettry of Nanocrystals and Nanowires. *Acc. Chem. Res.* 41, 1662-1673 (2008).

[8]. Ariga, K., Yamauchi, Y, Mori, T. & Hill, J. P. What Can Be Done with the Langmuir-Blodgett Method? Recent Developments and its Critical Role in Materials Science. *Adv. Mater.* 25, 6477-6512 (2013).

[9]. Yang, P. D. Wires on water. *Nature* 425, 243-244 (2003).

[10]. Huang, J. X., Tao, A. R., Connor, S., He, R. R. & Yang, P. D. A general method for assembling single colloidal particle lines. *Nano Lett.* 6, 524-529 (2006).

[11]. Huang, J. X., Kim, F., Tao, A. R., Connor, S. & Yang, P. D. Spontaneous formation of nanoparticle stripe patterns through dewetting. *Nat. Mater.* 4, 896-900 (2005).

[12]. Tao, A., Sinsermsuksakul, P. & Yang, P. Tunable plasmonic lattices of silver nanocrystals. *Nat. Nanotechnol.* 2, 435-440 (2007).

[13]. Collier, C. P., Saykally, R. J., Shiang, J. J., Henrichs, S. E. & Heath, J. R. Reversible tuning of silver quantum dot monolayers through the metal-insulator transition. *Science* 277, 1978-1981 (1997).

[14]. Kim, F., Kwan, S., Akana, J. & Yang, P. D. Langmuir-Blodgett nanorod assembly. *J. Am. Chem. Soc.* 123, 4360-4361 (2001).

[15]. Li, X. L., Zhang, G. Y, Bai, X. D., Sun, X. M., Wang, X. R., Wang, E. & Dai, H. J. Highly conducting graphene sheets and Langmuir-Blodgett films. *Nat. Nanotechnol.* 3, 538-542 (2008).

[16]. Tao, A., Kim, F., Hess, C., Goldberger, J., He, R. R., Sun, Y. G., Xia, Y. N. & Yang, P. D. Langmuir-Blodgett silver nanowire monolayers for molecular sensing using surface-enhanced Raman spectroscopy. *Nano Lett.* 3, 1229-1233 (2003).

[17]. Cao, Q., Han, S. J., Tulevski, G. S., Zhu, Y, Lu, D. D. & Haensch, W. Arrays of single-walled carbon nanotubes with full surface coverage for high-performance electronics. *Nat. Nanotechnol.* 8, 180-186 (2013).

[18]. Jin, S., Whang, D. M., McAlpine, M. C., Friedman, R. S., Wu, Y & Lieber, C. M. Scalable interconnection and integration of nanowire devices without registration. *Nano Lett.* 4, 915-919 (2004).

[19]. Cote, L. J., Kim, F. & Huang, J. Langmuir-Blodgett Assembly of Graphite Oxide Single Layers. *J. Am. Chem. Soc.* 131, 1043-1049 (2009).

[20]. Lu, Y., Yang, Y, Sellinger, A., Lu, M., Huang, J., Fan, H., Haddad, R., Lopez, G., Burns, A. R., Sasaki, D. Y, Shelnutt, J. & Brinker, C. J. Self-assembly of mesoscopically ordered chromatic polydiacetylene/silica nanocomposites. *Nature* 410, 913-917 (2001).

[21]. Mahmoud, M. A., Tabor, C. E. & El-Sayed, M. A. Surface-Enhanced Raman Scattering Enhancement by Aggregated Silver Nanocube Monolayers Assembled by the Langmuir-Blodgett Technique at Different Surface Pressures. *J. Phys. Chem. C* 113, 5493-5501 (2009).

[22]. Zhang, Y. W., Grass, M. E., Habas, S. E., Tao, F., Zhang, T. F., Yang, P. D. & Somorjai, G. A. One-step polyol synthesis and langmuir-blodgett monolayer formation of size-tunable monodisperse rhodium nanocrystals with catalytically active (111) surface structures. *J. Phys. Chem. C* 111, 12243-12253 (2007).

[23]. Xia, Y. N., Xiong, Y. J., Lim, B. & Skrabalak, S. E. Shape-Controlled Synthesis of Metal Nanocrystals: Simple Chemistry Meets Complex Physics? *Angew. Chem. Int. Ed.* 48, 60-103 (2009).

[24]. Tosheva, L., Gospodinova, N., Vidal, L., Mihai, I., Defaux, M., Ivanov, D. A. & Doyle, A. M. Monoparticulate films of polyaniline. *Thin Solid Films* 517, 5459-5463 (2009).

[25]. Fulda, K. U. & Tieke, B. Langmuir Films of Monodisperse 0.5-Mu-M Spherical Polymer Particles with a Hydrophobic Core and a Hydrophilic Shell. *Adv. Mater.* 6, 288-290 (1994).

[26]. Fulda, K. U. & Tieke, B. Monolayers of mono- and bidisperse spherical polymer particles at the air/water interface and Langmuir-Blodgett layers on solid substrates. *Supramol Sci* 4, 265-273 (1997).

[27]. Sheppard, E. & Tcheurek. N. Monolayer Studies. 3. Spreading of Polystyrene Latexes at Water/Air Interface. *Kolloid Z Z Polym* 225, 162-& (1968).

[28]. Cote, L. J., Kim, J., Zhang, Z., Sun, C. & Huang, J. X. Tunable assembly of graphene oxide surfactant sheets: wrinkles, overlaps and impacts on thin film properties. *Soft Matter* 6, 6096-6101 (2010).

[29]. Kurokawa, Y., Miyazaki, H. & Jimba, Y. Optical band structure and near-field intensity of a periodically arrayed monolayer of dielectric spheres on dielectric substrate of finite thickness. *Phys. Rev. B* 69 (2004).

[30]. Zhang, X. Y., Yonzon, C. R. & Van Duyne, R. P. Nanosphere lithography fabricated plasmonic materials and their applications. *J. Mater. Res.* 21, 1083-1092 (2006).

[31]. Vogel, N., Weiss, C. K. & Landfester, K. From soft to hard: the generation of functional and complex colloidal monolayers for nanolithography. *Soft Matter* 8, 4044-4061 (2012).

[32]. Fischer, U. C. & Zingsheim, H. P. Sub-Microscopic Pattern Replication with Visible-Light. *J Vac Sci Technol* 19, 881-885 (1981).

[33]. Kim, J., Cote, L. J. & Huang, J. X. Two Dimensional Soft Material: New Faces of Graphene Oxide. *Acc. Chem. Res.* 45, 1356-1364 (2012).

[34]. Kim, J., Cote, L. J., Kim, F., Yuan, W., Shull, K. R. & Huang, J. X. Graphene Oxide Sheets at Interfaces. *J. Am. Chem. Soc.* 132, 8180-8186 (2010).

[35]. Huang, J. X. Syntheses and applications of conducting polymer polyaniline nanofibers. *Pure Appl. Chem.* 78, 15-27 (2006).

[36]. Kim, F., Connor, S., Song, H., Kuykendall, T. & Yang, P. D. Platonic gold nanocrystals. *Angew. Chem. Int. Ed.* 43, 3673-3677 (2004).

[37]. Zou, D., Derlich, V, Gandhi, K., Park, M., Sun, L., Kriz, D., Lee, Y D., Kim, G., Aklonis, J. J. & Salovey, R. Model filled polymers. I. Synthesis of crosslinked monodisperse polystyrene beads. *J. Polym. Sci., Part A: Polym. Chem.* 28, 1909-1921 (1990).

[38]. Luo, J. Y, Kim, J. & Huang, J. X. Material Processing of Chemically Modified Graphene: Some Challenges and Solutions. *Acc. Chem. Res.* 46, 2225-2234 (2013).

[39]. Hummers, W. S. & Offeman, R. E. Preparation of Graphitic Oxide. *J. Am. Chem. Soc.* 80, 1339-1339 (1958).

What is claimed is:

1. A system for forming a film, comprising:
    a trough containing water defining an air-water interface between air and the water, and having at least two barriers being separated from and movable in parallel to each other to define an area therebetween on the air-water interface;
    an electrospraying device comprising a syringe having a metal needle connected to a power supply set at 10 kV and positioned above the air-water interface, configured to spread a solution containing a material of interest onto the air-water interface of water at a feed rate in a range of 0.5-2.0 ml/h, without producing air flow to disturb the air-water interface, to form a film of the material of interest in the area between the at least two barriers at the air-water interface; and
    a grounding wire submerged in a water subphase from a place outside the area between the at least two barriers in the trough,
    wherein the area between the at least two barriers is changeable by parallel moving the at least two barriers on the air-water interface so as to tune a particle packing density of the film formed in the area; and
    wherein the trough is equipped with a tensiometer and a dip coater for recording an isothermal surface pressure-area curve of the film formed in the area.

2. The system of claim 1, wherein the syringe is connected to a syringe pump to control a flow rate of the solution.

3. The system of claim 1, wherein the solution contains a dispersion of the material of interest in water, a water-miscible solvent, or a mixture of them.

4. The system of claim 1, wherein the solution contains a stock solution of the material of interest.

5. The system of claim 4, wherein the stock solution contains a water-miscible solvent.

6. The system of claim 5, wherein the stock solution of the material of interest is devoid of a surface medication or a solvent exchange.

7. The system of claim 4, wherein the solution further contains a water-miscible solvent added into the stock solution of the material of interest in water.

8. The system of claim 1, wherein the solution contains aqueous colloidal dispersions.

9. The system of claim 1, wherein the material of interest comprises Au/polyvinylpyrrolidone (PVP) particles, polystyrene (PS) beads, polyaniline (PANI) nanofibers, graphene oxide (GO) sheets, nanoparticles of other materials, or biological colloids.

10. The system of claim 1, wherein the film is of a monolayer.

* * * * *